(12) United States Patent
Yamaguchi (10) Patent No.: US 6,816,553 B1
(45) Date of Patent: Nov. 9, 2004

(54) CODING METHOD FOR AN IMAGE SIGNAL

(75) Inventor: Hirohisa Yamaguchi, Tsukuba (JP)

(73) Assignee: Texas Instruments Incorporated, Dallas, TX (US)

( * ) Notice: Subject to any disclaimer, the term of this patent is extended or adjusted under 35 U.S.C. 154(b) by 1132 days.

(21) Appl. No.: 09/040,561

(22) Filed: Mar. 18, 1998

(30) Foreign Application Priority Data

Mar. 18, 1997 (JP) .............................................. 9-064330

(51) Int. Cl.$^7$ ............................................... H04N 7/12
(52) U.S. Cl. ............ 375/240.18; 375/240; 375/240.01; 382/238
(58) Field of Search ............................... 348/420, 413, 348/411; 382/238; 375/240.18

(56) References Cited

U.S. PATENT DOCUMENTS

| | | | |
|---|---|---|---|
| 5,107,345 A | * | 4/1992 | Lee .............................. 348/420 |
| 5,485,279 A | * | 1/1996 | Yonemitsu et al. .......... 348/411 |
| 5,504,530 A | * | 4/1996 | Obikane et al. ............. 348/413 |
| 5,832,124 A | * | 11/1998 | Sato et al. ................... 382/238 |

* cited by examiner

Primary Examiner—Chris Kelley
Assistant Examiner—Allen Wong
(74) Attorney, Agent, or Firm—Bret J. Petersen; W. James Brady, III; Frederick J. Telecky, Jr.

(57) ABSTRACT

To provide high quality coding with respect to both interlace video and progressive video. It is a coding method for image signals, which includes the steps of dividing the picture elements within 1 macroblock of input image signals into multiple groups, totalling each group as interlace video by executing DCT (block 31), comparing said totalled result and the result of DCT (block 32) executed with respect to the entire picture elements within said 1 macroblock, and selecting one of the DCT results (block 34).

3 Claims, 6 Drawing Sheets

FIG. 1a
INTERLACE VIDEO FORMAT

OMITTED LINE SIGNAL    0      AFTER 1/60 SEC      AFTER 1/30 SEC

FIG. 1b
PROGRESSIVE VIDEO FORMAT

0      AFTER 1/60 SEC      AFTER 1/30 SEC

CODING METHOD FOR AN IMAGE SIGNAL

FIELD OF THE INVENTION

The present invention relates to the processing of image signals. In particular it relates to the coding of both the interlace video and progressive video signals.

BACKGROUND OF THE INVENTION

A new video source format referred to as progressive video has been proposed in industries such as those for package-type video contents, video devices, etc., in order to improve the picture quality. However, it became apparent that when progressive video is compressed using the present MPEG digital video compression standard, there is a problem with the inconsistency between the quality that is provided and the bit amount that is necessary. In the present invention, a solution is proposed that is very effective with regard to developing the MPEG-2 video compression standard.

Television signals are essentially the standardized display of optical images in a certain amount of time and vertical direction, with complete digital video signals being obtained by digitalizing the video for each scan line.

Figure 1A:
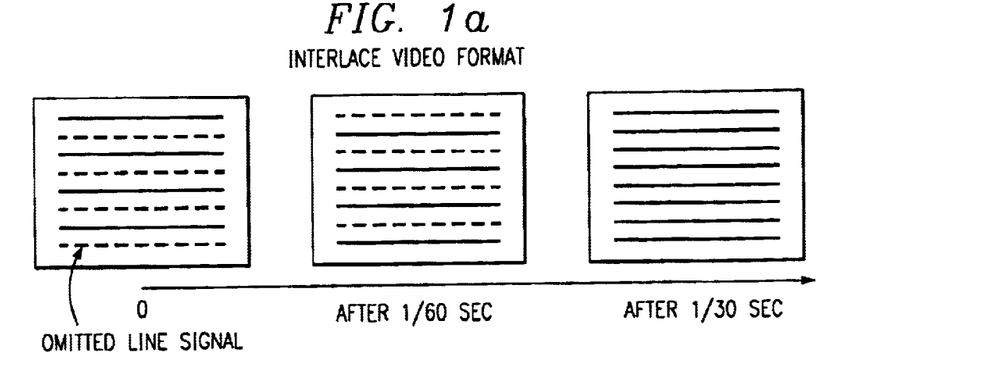
FIG. 1 is an interlace and progressive video formats.
Figure 1B:
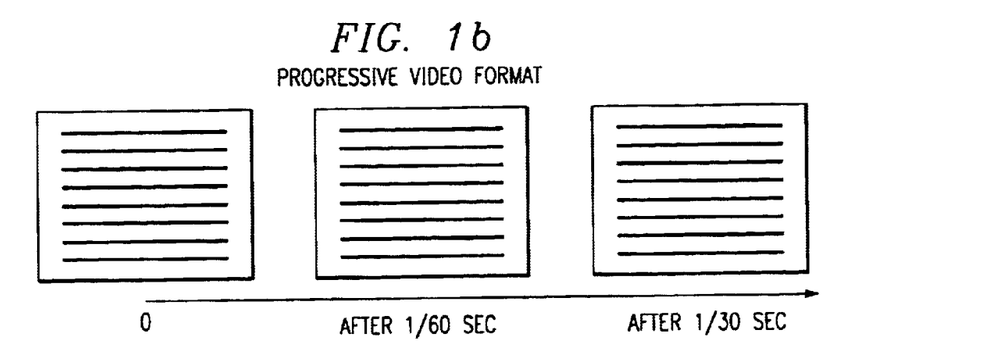

FIG. 1(a) shows a regular interlace video format and FIG. 1(b) shows a progressive video format provided with video of high quality and that does not have artifacts due to an interlace, such as a flicker, etc. Progressive video format is a basic approach for displaying optical images in which first of all the optical image is captured, the captured signals (two-dimensional signals) then being scanned with and made into a set of discrete scan lines. The time period for capturing the image is 1/60 sec in countries (includes Japan and U.S.) that apply the NTSC television standard. Each image captured is thus referred to as a frame.

Analog television signals require a wide frequency bandwidth for broadcasting, so a means that is effective for reducing the analog bandwidth in half by interlacing the scan lines as shown in FIG. 1(a) has been considered. In this technology, each image that was captured is scanned with every other scan line and every other image is complementarily scanned. Each of this type of complementary image is referred to as a field. When interlace video and progressive video are compared, 1 frame of progressive video corresponds to 2 fields of interlace video.

When using interlace, it is necessary to forfeit some degree of quality regardless of the efficiency of the bandwidth. This is indicated best in the explanation for the frequency space of a sampling spectrum shown in FIG. 2. FIG. 2 shows the frequency space of progressive and interlace video spectra with the horizonal axis being the time frequency.

Figure 2A:
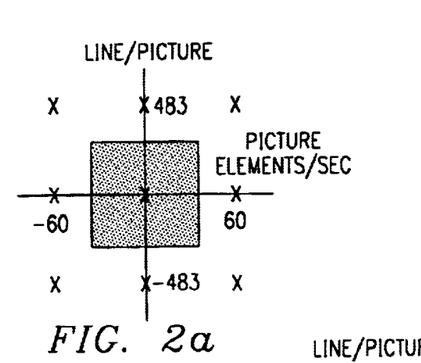
FIG. 2 is a figure explaining the frequency space of progressive and interlace video spectra. The horizontal axis indicates the time frequency.

In (a), "x" indicates the repetitious frequency of the baseband spectrum in the case of progressive video. In a television of the NTSC system, 480 scanned images are shown on the monitor. The block applied with shading indicates the frequency "width" necessary for restricting the baseband spectrum in order to avoid the aliasing phenomenon that occurs with respect to repetitious spectrum generated in the "x" part.

Figure 2B:
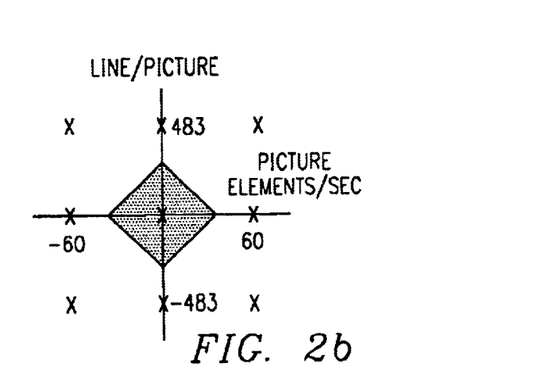

(b) shows the baseband spectrum without aliashing with respect to interlace video. It is necessary to restrict the baseband spectrum to ½ of the progressive video due to excess repetitious frequency.

Figure 2C:
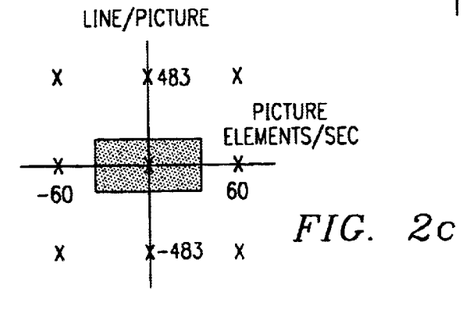

(c) shows another method for restricting the bandwidth to ½ with respect to interlace video. This baseband spectrum is preferable to (b) when there is a necessity to maintain a higher resolution during fast motion.

In the case of the interlace video, the bandwidth has to be restricted to ½ in comparison with progressive video in order to avoid the eiriashingu phenomenon. In the two methods shown in FIGS. 2(b) and (c), there are many cases of the method in (c) being preferable since the resolution is higher during fast motion. In the case of (b), the fine parts of the image are lost in an unfavorable form as the motion becomes greater and give an impression to the viewer of the image transiently becoming blurry due to the motion. In the case of (c), a higher resolution is maintained even in fast motion, but it is necessary to accordingly forfeit the resolution during standstill. When (a) and (c) are compared, it is readily apparent that progressive video can maintain a vertical frequency bandwidth that is twice that of the interlace video.

The fact that progressive video transmits video signals of (vertical) frequency with a wide bandwidth that is double that of interlace video was explained. However, the interlace video format has been used in ordinary televisions since the start of public broadcasting. The household television presently receives and displays said interlace television signals. On the other hand, most PC monitors display images in the progressive video format for conditions of very high resolution and quality. The problem of whether future televisions should use the progressive video format in order to gain high quality has been a major argument since digital television technology appeared.

MPEG-1 and MPEG-2 are presently global standards for broadcast and memory-use digital video compression. Below, the discussion will be restricted to basic P-frame coding for simplification. Extension to the B-frame is easy, so an explanation will be omitted.

Figure 4:
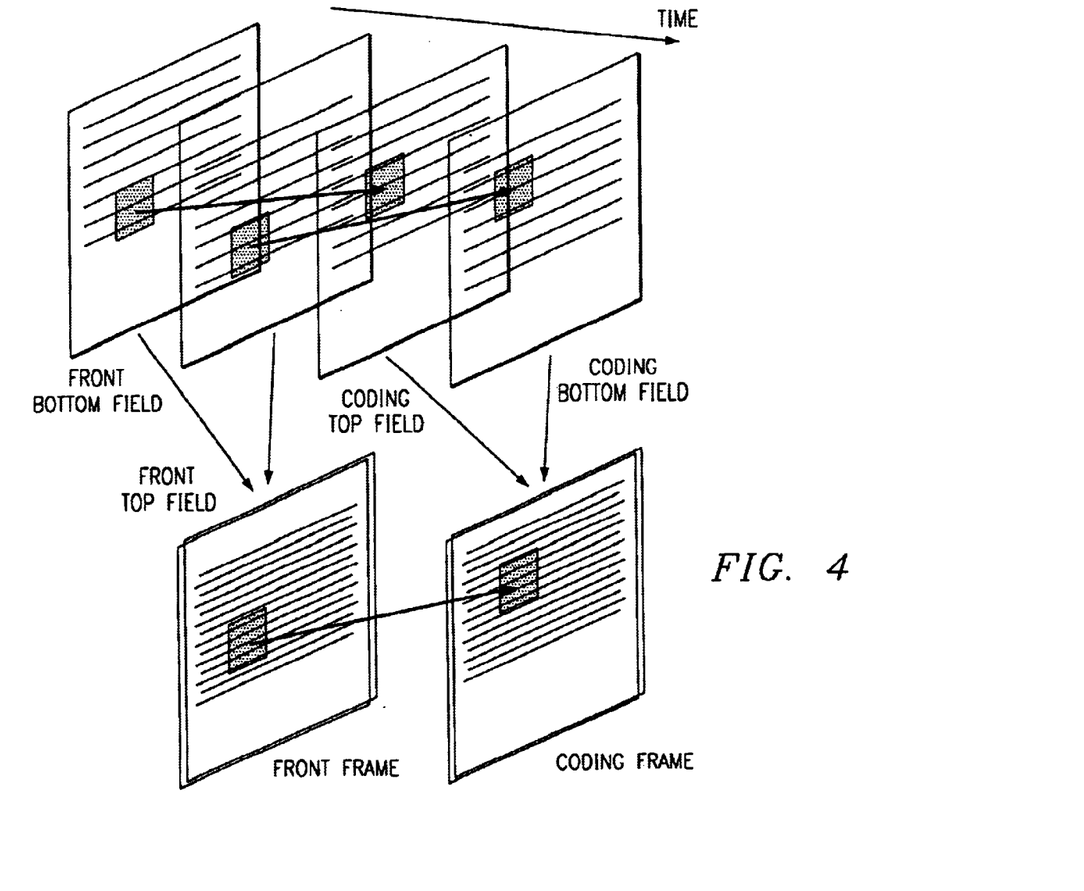
FIG. 4 is a figure showing the motion vector for specifying the block signal that best matches between the fields and between the frames.

In MPEG, interlace video is compressed due to the combination of motion estimation/compression and frequency-space coding that uses DCT (discrete cosine transformation). In order to use this method, the field sequence is paired as shown in FIG. 4. Each field is alternately scanned as shown in FIG. 1, so when two fields are paired—which is composed for one to be the to-be-scanned image at the top in and the other to be the scan image at the bottom—it becomes the same number of scan lines as the entire frame as shown in FIG. 4. This is actually referred to as the frame of the interlace video.

Figure 3:
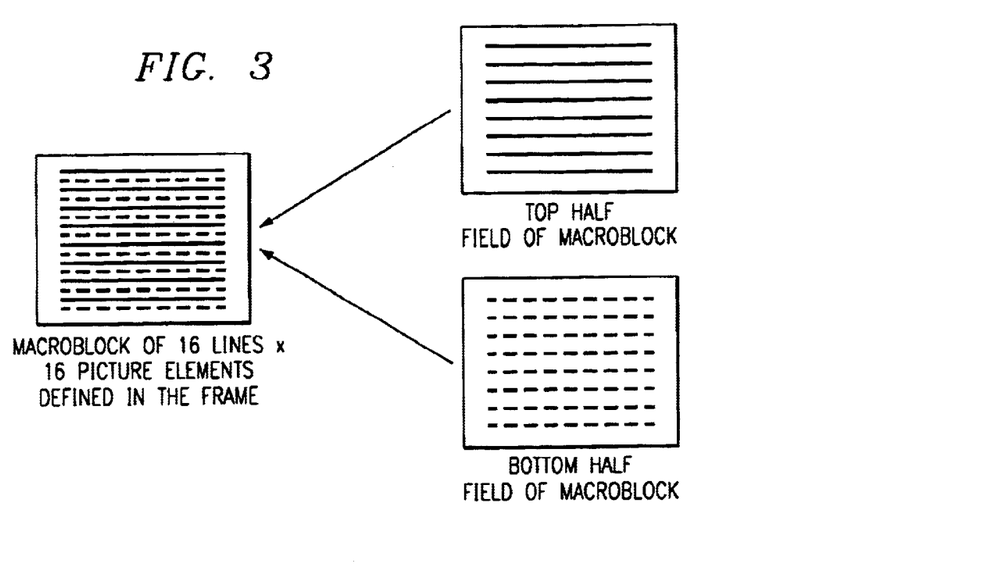
FIG. 3 is a figure explaining two field blocks and a macroblock.

Next, this frame is divided into blocks with the same dimensions of 16 lines (scan line)×16 picture elements. This is defined as the basic block dimensions with respect to DCT and motion estimation/compensation. The image signal of this unit is referred to as a micro block. If referred to in the original 2 fields, each micro block corresponds to a pair of field blocks with dimensions of 8 lines×16 picture elements as shown in FIG. 3. In FIG. 3, a micro block with dimensions of 16 lines×16 picture elements held within a frame and two corresponding field blocks, referred to as a top field block with dimensions of 8 lines×16 picture elements and a bottom field block with the same dimensions are shown.

In MPEG, motion estimation/compensation is basically executed between the fields and between the frames as shown in FIG. 4. First of all, the block that best matches within the field that was coded then decoded beforehand with respect to each field block is searched for as shown at the top of the figure. Each of the two field blocks thus has one motion vector. Motion estimation is executed even within the frame block (microblock) as indicated at the bottom half of FIG. 4. In this case, there is only one vector for each micro block.

After finding these two types of motion vectors, one of these two types of motion estimation is decided based on the condition that the difference between the motion estimation block signal and the coding signal is small. If it is apparent that the frame motion estimation like that shown at the bottom half of FIG. 4 is more effective, the frame motion estimation is selected with respect to the macroblock. Thereafter, the margin of the motion estimation difference signal is transformed into the coefficient of the frequency space using DCT.

Figure 5:
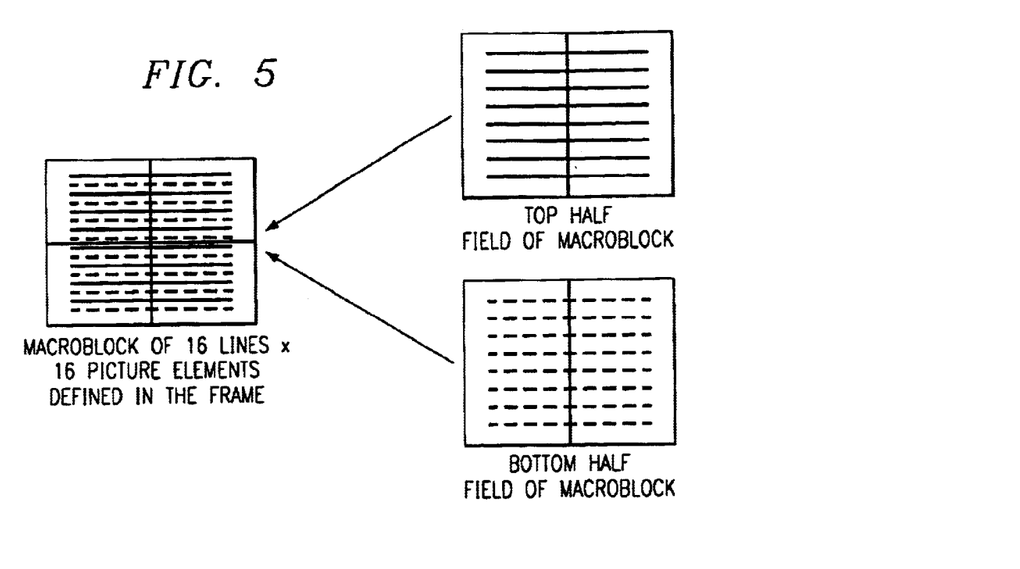
FIG. 5 is a figure explaining the two different methods applied with a discrete cosine transformation with respect to the residual error created with motion compensation.

When using DCT, a selection must be made between the DCT used in the frame block and the DCT used in the field block. DCT is used in a block with dimensions of 8 lines×8 picture elements. Therefore, there are 4 blocks (with respect to the brightness component) in a macroblock with dimensions of 16 lines ×16 picture elements. There are two methods for defining a block of 8 lines×8 picture elements as shown in FIG. 5. It is generally known that the frame mode DCT shown in the left half of FIG. 5 is more effective in still video and the field mode DCT shown in the right half of FIG. 5 is more effective in a video with fast motion. The discrimination reference that is normally used to select from these two DCTs is applied to compare the high frequency energy created by these two methods.

There are two methods for using MPEG in progressive video.

Figure 6:
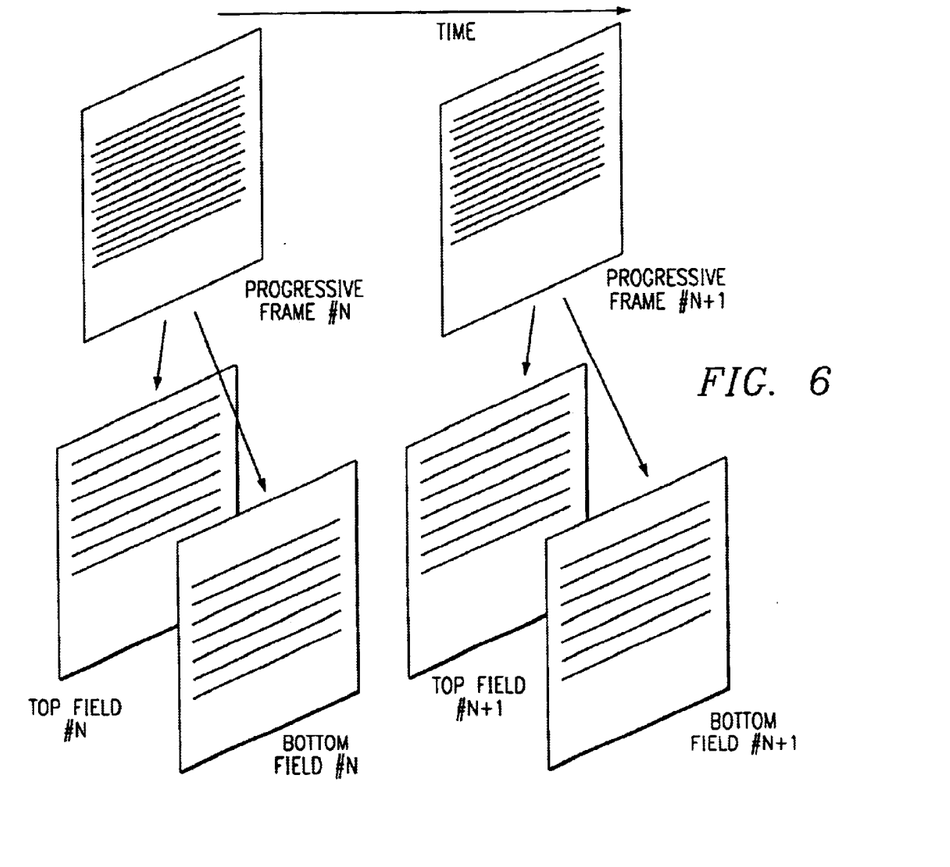
FIG. 6 is a figure explaining a method that applies MPEG to progressive video.

(1) The first method is to resolve the progressive video into two affiliated interlace videos. At this time, the top field is extracted from progressive frame #N and the bottom field is extracted from progressive frame #N+1. Next, this interlace video is coded using MPEG. Thereafter, the affiliated interlace video (the bottom field from progressive frame #N and the top field from progressive frame #N+1) is coded. The method is shown in FIG. 6. MPEG is used for coding the interlace video sequence applied with shading, then the other interlace video sequence can be coded by applying DCT and using motion estimation in relation to said coded interlace video. This method is referred to as the scalable option of MPEG. The coded video information is composed of basic interlace video and an affiliate thereof, which is spatially added in order to expand said basic interlace video into complete progressive video. Therefore, this option can provide video to both the viewers of interlace video and viewers of progressive video. The viewers of interlace video reproduce the video from the basic coded part and discard the increased affiliated information.

There are two problems with this method. Firstly, the viewer of interlace video must pay for the increased affiliated information that said viewer does not watch. In MPEG, a common bit stream is distributed to each household when a scalable option is used regardless of whether the final user watches the video in the interlace format or watches it in the progressive format. Another problem is that the viewer of progressive video must bear the decrease in the compression efficiency. It is best to compress the progressive video with the progressive format. Namely, instead of resolving the progressive video into two interlace videos and introducing a scalable option as shown in FIG. 6, a higher compression efficiency is achieved by applying motion estimation/compensation directly to the progressive frame as shown at the bottom half of FIG. 4. This method, which codes the progressive video, is referred to as nonscalable progressive video coding in comparison with the coding using the scalable option. On the other hand, if the source video is provided in the interlace video format and the final video is displayed as interlace video, transmitting the interlace video in the progressive video format creates waste in the coding information. In actuality, the viewers of interlace video can receive an improved interlace video quality when the original source is coded with interlace video.

Figure 7:
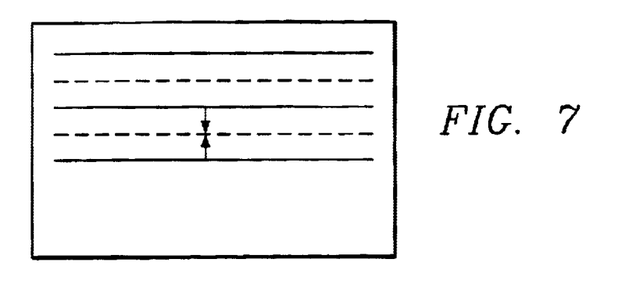
FIG. 7 is a figure explaining another method that applies MPEG to progressive video.

(2) Another method with respect to progressive video is that which is closer to the interlace video. This method must forego the transmission of complete progressive video, but it is that which attempts to interpolate and add omitted scan lines with respect to the transmitted interlace video in the final display. One method for this is to average the value of the picture element closest to the scan line as shown in FIG. 7. This method does not influence the quality of the coded interlace video so it is possible for the viewers of interlace video to receive the merit of high quality video. The problem is that the quality of the progressive video achieved on the receiving side by this method does not reach a satisfactory level when compared with the progressive video achieved by the method in (1).

Figure 8:
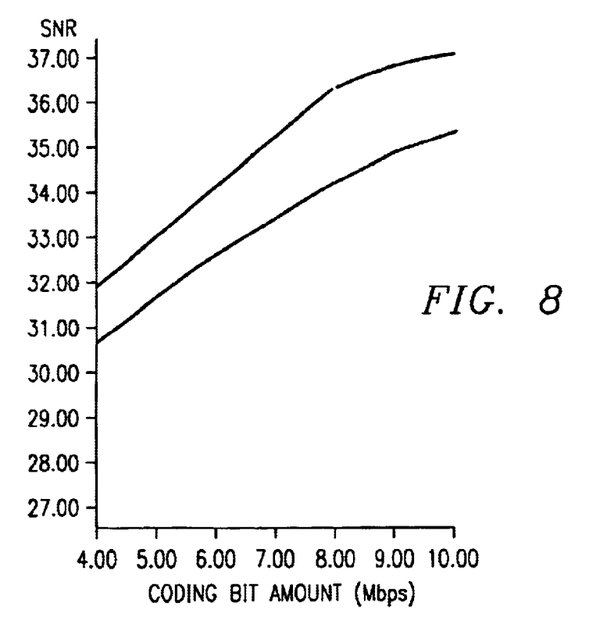
FIG. 8 is a figure showing the simulation result in two methods for realizing progressive video coding using MPEG.

FIG. 8 shows a typical simulation result in said two cases. The horizontal axis indicates the coding bit amount and the vertical axis indicates the signal to (coding) noise ratio (SNR). Here, a large numeric value indicates that the quality is high. The curved line in the middle indicates that SNR of nonscalable progressive video improves when the coding bit amount increases. The SNR of the scalable option coding is lower than this result, thus it is not shown in the figure. This curved line indicates the highest SNR when MPEG is applied to progressive source video.

The uppermost curved line indicates the SNR when the source is interlace video and when the coding is also executed with interlace video. The curved line in the middle correponds with progressive video having a broad source signal spectrum like what is shown in FIG. 2(a), but caution is necessary regarding the fact that the uppermost curved line corresponds with interlace video that needs to restrict the bandwidth in order to avoid the eiriashingu effect like what is shown in FIGS. 2(b) and (c). The interpolation of an omitted scan line as shown in FIG. 7 has a low pass filter function with respect to interlace video, and the spectrum shown in FIG. 2(a) approaches the spectrum shown in FIG. 2(c). The curved line at the bottom indicates SNR corresponding to the progressive video, namely, the SNR of progressive video formed with interpolation from the interlace video coded with the same bit amount.

Consequently, if source video is provided with the progressive format and if this is coded with the interlace video format, the SNR becomes higher (although it is accompanied by a noticeable aliashingu phenomenon) as interlace video but results in the SNR of the corresponding progressive video, obtained by interpolating interlace video, being very unfavorable compared to the original progressive video coded with nonscalable progressive video MPEG. To state more simply, it indicates that coding with nonscalable progressive MPEG is necessary in order to code the progressive source and to reproduce such in a satisfactory quality on the final progressive display device. Viewers of interlace video receive the merit of interlace video of higher quality obtained with the reproduced high-quality progressive video. The coding of the progressive video can thus guarantee a high-quality video service with respect to viewers of both interlace video and progressive video.

On the other hand, when the source video is provided in the interlace format having a correct band restriction as shown in FIG. 2(b) or (c), to transmit this, it is necessary to first interpolate the omitted scan lines then feed excess information thereafter for coding. The viewers of interlace video discard the increased scan lines during the display resulting in a great waste of information. As is apparent when the uppermost curved line and the middle curved line in FIG. 8 are compared, interlace video has a slightly better quality, so the conclusion can be made that if the original source video is the interlace format (having suitable band restrictions), and this is observed on an interlace video display device, it is preferable to code this in the interlace video format.

When the arguments above are summarized:

(1) When the source video is in the progressive format of a complete bandwidth, it is preferable to code with the progressive format regardless of whether this is dislpayed on a progressive video monitor or displayed on an interlace video monitor.

(2) When the source video is interlace video in which the the bandwidth is restricted, it is preferable to code in the interlace format.

(1) notes a positive merit for introducing progressive video. However, (2) cites a problem that needs to be solved for the progressive technology to be widely accepted by the industry. Namely, it means that the solution involves improving the nonscalable progressive MPEG in the coding performance with respect to the interlace video source. The present television is based on the interlace video technology. The development of a solution that can code the interlace source video for a greater performance level is needed.

SUMMARY OF INVENTION

The present invention relates to a progressive video coding technology that aims to solve the problem in (2) while maintaining the merit of progressive video coding noted in (1).

The present invention provides a coding method for image signals; it is a coding method for image signals and includes the steps of dividing the picture elements within 1 macroblock of input image signals into multiple groups, totalling each group as interlace video by executing DCT, comparing said totalled result with the result of the DCT executed with respect to the entire picture elements within said 1 macroblock, and selecting one of the DCT results.

BRIEF DESCRIPTION OF THE DRAWINGS

(30) is a DCT part, (31) an interlace DCT mode part, (32) a progressive DCT mode part, (33) an interpolation part, and (34) a comparison part.

DESCRIPTION OF EMBODIMENTS

An embodiment will be explained while referring to the figures.

Figure 9A:
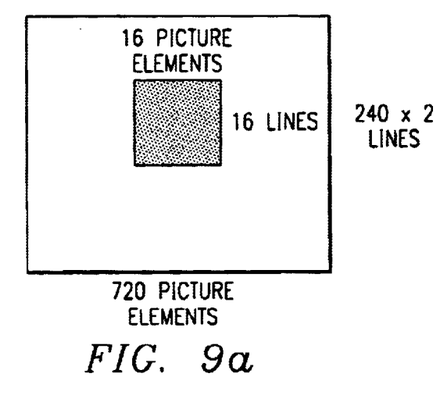
FIG. 9 is a figure showing the correspondence of the macroblock between the interlace video and progressive video.
Figure 9B:
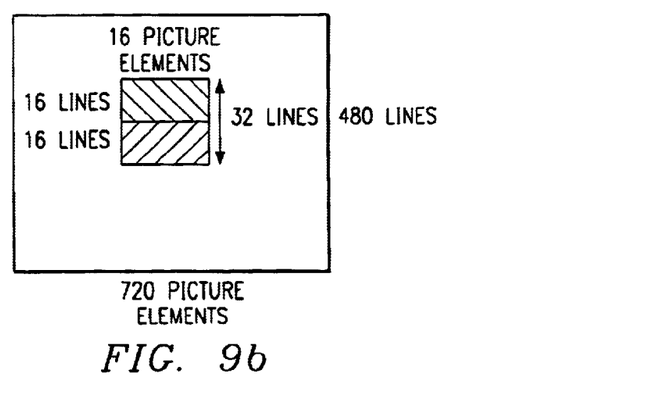

The reason for a coding defect occurring in progressive video is that it is necessary to first, extend the original interlace video having a suitable bandwidth restriction into a progressive video format as shown in FIG. 9 then to perform coding as progressive video. For this image extension, one macroblock ((a) on the left side) within 1 frame of interlace video is handled as two macroblocks in the extended progressive video ((b) on the right side).

This is the cause for the coding information increasing in spite of the fact that the quantity of source video information does not change. To state more specifically, when the original interlace video is coded into interlace video with MPEG, 1 macroblock with dimensions of 16 lines×16 picture elements
   with the selection of a motion vector of 1 frame/motion vector of 2 fields
   with the selection of frame DCT/field DCT (256 picture elements) expresses the coded information thereof while, on the other hand, it becomes as follows when coded into progressive video.

2 macroblocks with dimensions of 32 lines×16 picture elements
   motion vector of 2 frames
   coding only with frame DCT (512 picture elements)

The quantity of the mode selection bit, indicating whether it is DCT used in the frame block or DCT used in the field block, is minimal when looked at from the bit amount as a whole. The efficiency of the motion estimation is generally high in the progressive video format and the net quantity of the motion vector information can be compared between the interlace video and the progressive video. The maximum difference is the number of coded picture elements. The efficiency of the energy loading performance is degraded when the image signals that were interpolated and extended are transformed into a frequency coefficient by DCT of fixed dimensions (8×8). This problem can be solved when introducing a new concept to progressive video MPEG coding as shown in FIG. 10, namely, introducing 2 DCT modes.

Here, a macroblock of progressive video with dimensions of 32 lines×16 picture elements will be considered. This corresponds with the orignal one macroblock with dimensions of 16 lines×16 picture elements in the interlace video, so it is convenient for explanation.

Figure 10:
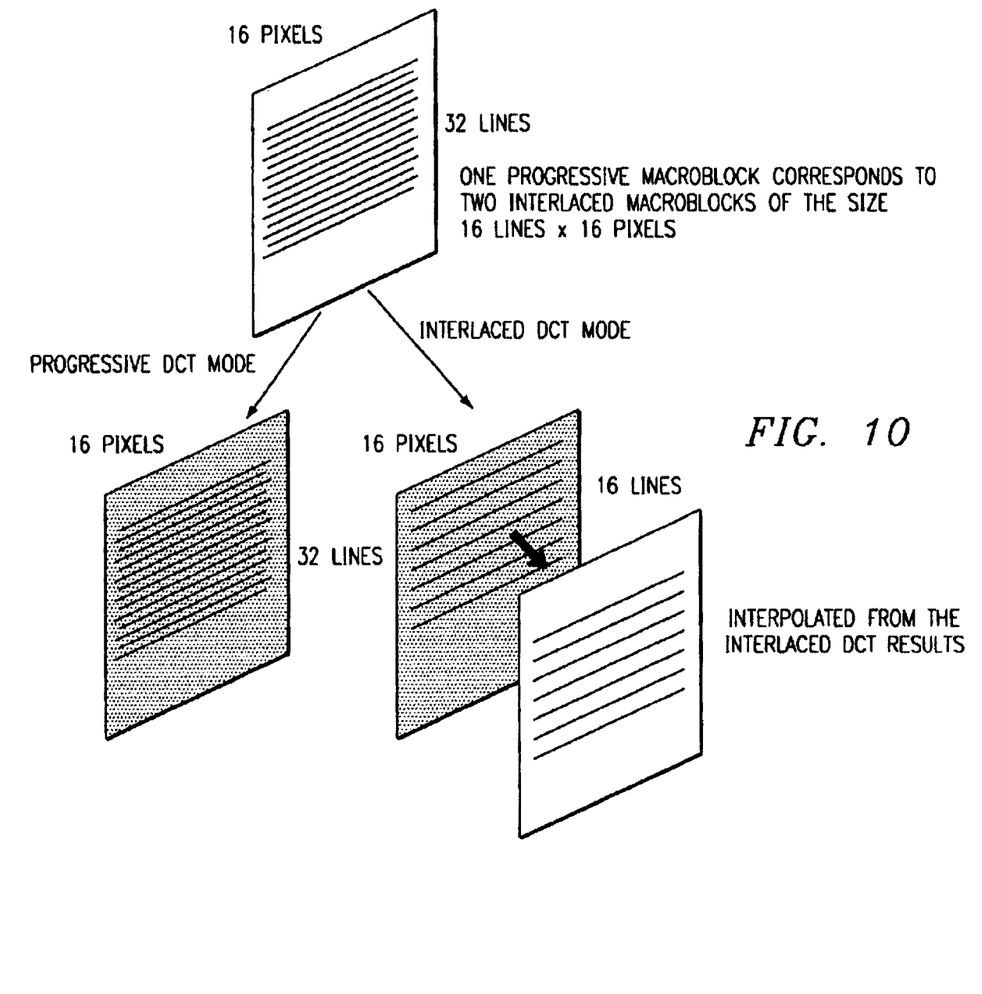
FIG. 10 is a figure explaining the concept of 2 DCT modes used in the present invention.

As shown in FIG. 10 the method related to the present invention initially handles the image of 32 lines×16 picture elements with 16 lines×16 picture elements of interlace, then obtains the other 16 lines×16 picture elements by interpolation. This is referred to as interlace DCT. The result thereof is then compared with the conventional method (progressive DCT), which applies DCT to the entire 32 lines×16 picture elements. This comparison can be executed by a number of different methods. One method is to use the interpolation error as a criterion for success in the interlace DCT. Namely, if the interpolation error is more than the prescribed value (dB), the result according to interlace DCT is selected and the result according to progressive DCT is not selected. Another method compares the coding bit count in the progressive DCT and interlace DCT for coding the macroblock image of the same quality and selects the DCT with a lower coding bit count.

By introducing this new extended DCT mode to the MPEG standard, even interlace source video can be coded at a high performance level using the interlace DCT mode among the two modes. Therefore, it is possible to code the entire video source including the interlace video source in one progressive video format. For this, it is necessary to introduce a mode selection flag (or equivalent coding mode) of 1 bit for each progressive macroblock (32 lines×16 picture elements). One of the DCT modes is then used according to the content of the mode selection flag.

Figure 11:
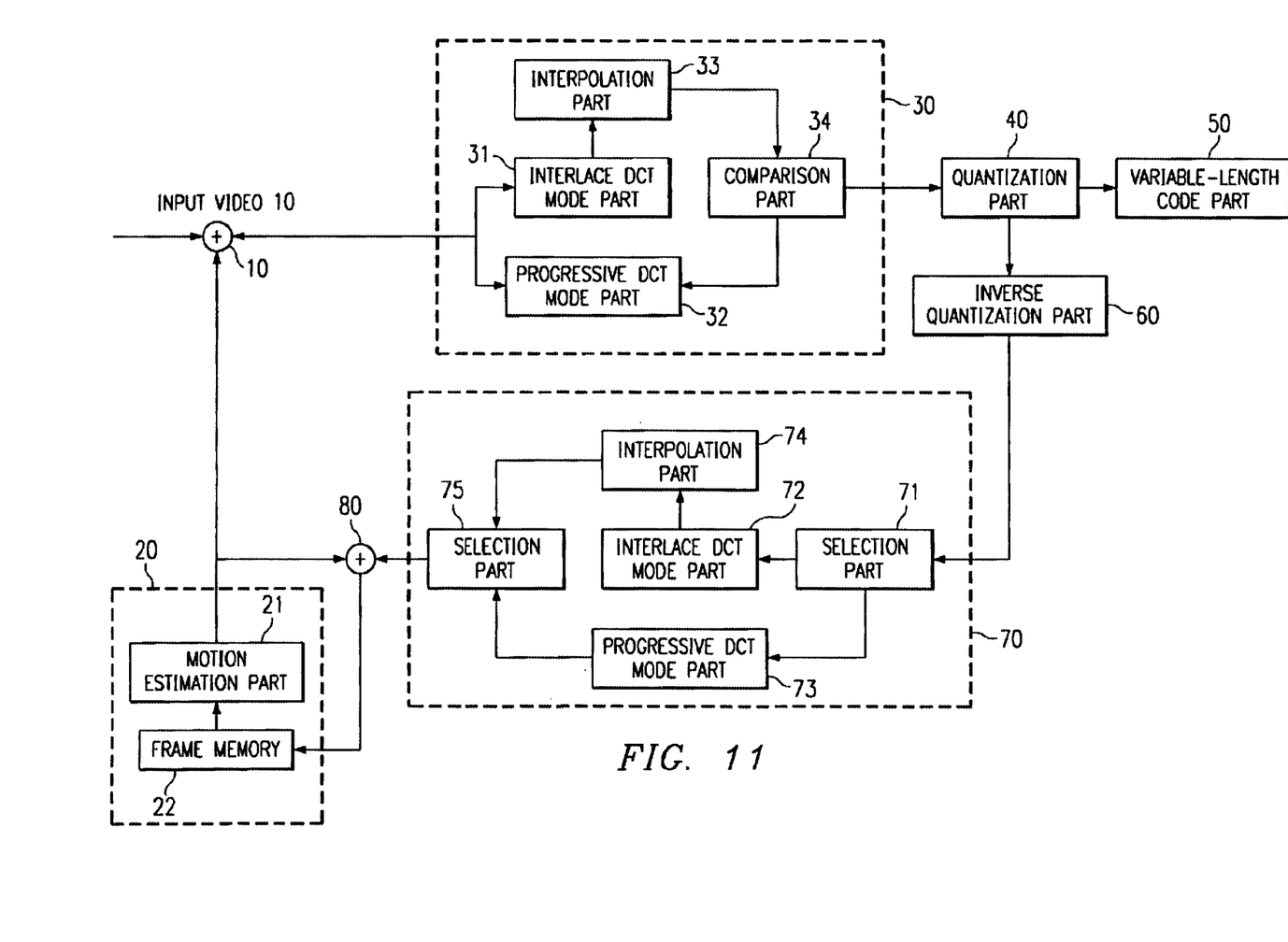
FIG. 11 is a block diagram showing the structure of a MPEG coding loop related to an embodiment of the present invention.

FIG. 11 shows a block diagram of a new coding example for realizing the technology proposed here. Details of the operation will be explained. Motion estimation with respect to the input video (digital progressive video) is executed in block 20, which includes frame memory 22 and motion estimation part 21. Even the motion compensation prediction signal is created in this block 20, with this being substracted from the input video signal in substractor 10. The prediction error signal obtained as a result is executed with DCT in progressive DCT mode part 32 and interlace DCT mode part 31 of DCT part 30, with one being selected in comparison part 34. The DCT coefficient thus obtained is quantized in quantization part 40, then output to variable-length code part 50. In order to continue with the coding of the frame hereafter, it is necessary to store the coded video in local frame memory 22 within block 20. For this objective, the quantized result is removed from the quantization in inverse quantization part 60, then executed with inverse DCT (inverse transformation) in inverse DCT part 70 according to the same DCT mode as that used in DCT part 30. This result is added with the motion compensation prediction signal in adder 80, then written in local frame memory 22.

An explanation was given that defining the dimensions of 32 lines×16 picture elements is convenient for handling the progressive video with respect to the conventional interlace video MPEG but this is not an essential condition. The macroblock can be defined with 16 lines×16 picture elements with respect to the progressive video. Even in FIG. 10, it is necessary to place each interpolated scan line between the coded scan lines as shown in FIG. 7 in order to obtain interpolated 16 lines×16 picture elements from coded 16 lines×16 picture elements. However, interpolation of the scan line on the bottom requires the value of the scan line immediately outside of the present macroblock in each macroblock. Therefore, complete interpolation can be executed only after many of the previous macroblocks have been coded and the coded results become accessible. The condition of this causal relationship must be applied strictly only with respect to block 70 in FIG. 11. Even if the simplified criterion rule is applied to block 30, there is no influence on the operation of the coding loop.

As noted above, an embodiment was explained, but the present invention is not restricted by it.

High quality coding is provided with respect to both interlace video and progressive video.

What is claimed is:

1. A method of coding original progressive video signals and progressive video signals derived from interlaced video signals comprising the steps of:

a) producing a first DCT result on (n pixels*m/2 lines) of information from (n pixels*m lines) of information of one macroblock of an input video signal;

b) producing a second DCT result by interpolation from the first DCT result;

c) adding the second DCT result and the first DCT result;

d) comparing the added DCT result of step c with a DCT result produced on the entire (n pixels*m lines) of information, and e) selecting an optimum coding based on the comparison results in step d.

2. The method of coding video signals of claim 1 wherein the selection in step e uses an interpolation error as a criterion for selection.

3. The method of coding video signals of claim 1 wherein the comparison of step d determines the coding bit count to use as a criterion for selection in step e of the coding having the lowest coding bit count.

* * * * *